Aug. 14, 1945.  P. W. GAENSSLE ET AL  2,382,870
BRAKE MECHANISM
Filed June 23, 1944
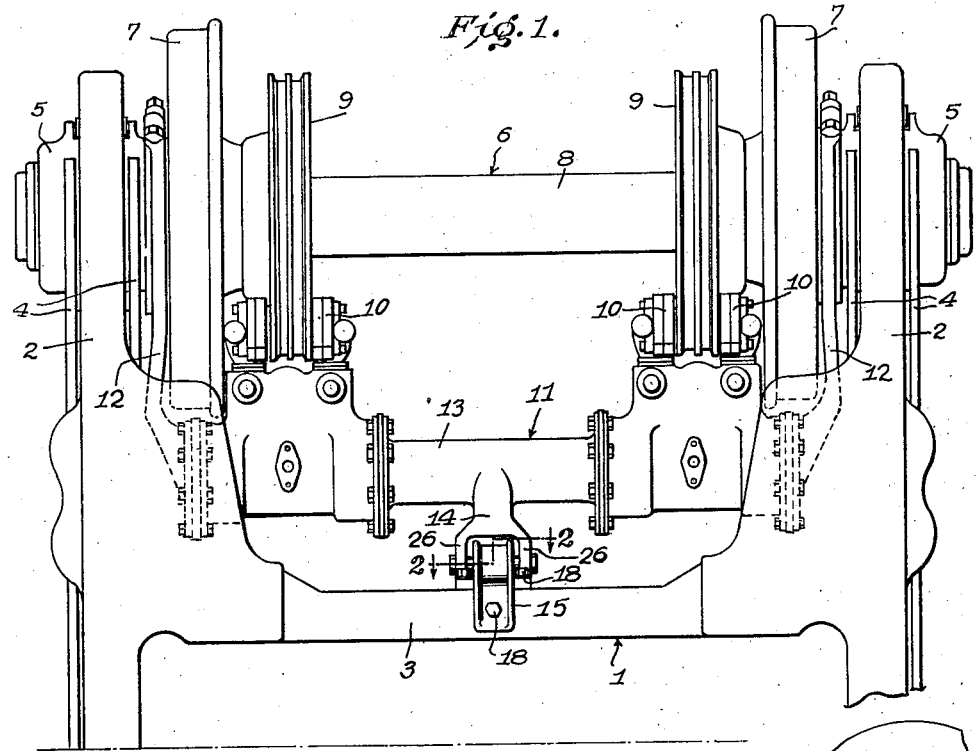
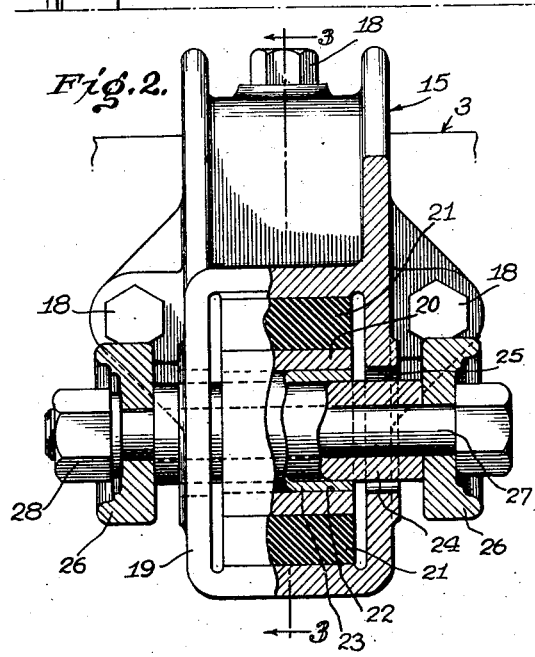
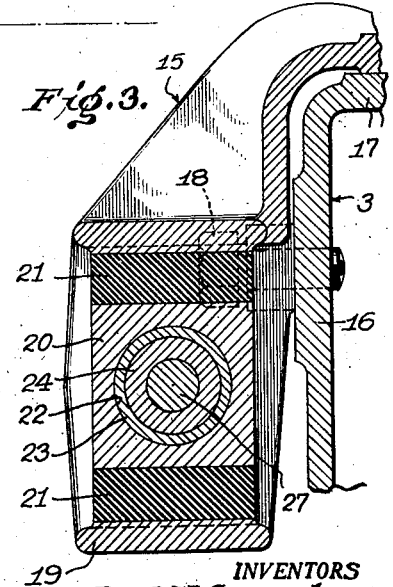
INVENTORS
Paul W. Gaenssle and
BY Robert G. Stacy
ATTORNEY Patented Aug. 14, 1945

2,382,870

UNITED STATES PATENT OFFICE 2,382,870

BRAKE MECHANISM

Paul W. Gaenssle and Robert G. Stacy, Detroit, Mich., assignors to Budd Wheel Company, Philadelphia, Pa., a corporation of Pennsylvania Application June 23, 1944, Serial No. 541,773

2 Claims. (Cl. 188—205)

The invention relates to brake mechanism, and more particularly to the support means for such mechanism used with vehicles, such as railway trucks.

The invention has to do more especially with the demountable securement of a brake supporting yoke of substantially U- or C-form in which the yoke is supported at its ends in concentric relation with the ends of an adjacent wheel and axle assembly of a railway truck and intermediate its ends by a cushioned universal connection to the truck frame.

It is an object of the present invention to facilitate the manufacture of and simplify the structure of the support of the brake-supporting yoke of this class from the truck frame and to make said yoke more readily demountable from the truck frame while still retaining the desirable feature of universal and cushioned movement in the connection between the parts.

The object is attained in large part by making the hanger bracket a unit subassembly including the universally movable and cushioned parts and demountably securing the yoke to said part by a single readily removable clamping means.

This and further objects and advantages and the manner in which they are attained will become evident from the following detailed description when read in connection with the drawing forming a part of this specification.

In the drawing,

Fig. 1 is a plan view of one-half of a railway truck showing the invention applied thereto;

Fig. 2 is an enlarged detail part-sectional and part-elevational view through the hanger connection, the view being taken substantially along the line 2—2 of Fig. 1; and Fig. 3 is a detail vertical sectional view taken substantially along the line 3—3 of Fig. 2.

The railway truck and the brake mechanism applied thereto is shown as generally similar to that disclosed in the above-referred-to application, except for the manner in which the brake-supporting yoke is connected to the frame, which latter connection forms the subject of the present invention.

The truck comprises the frame 1 consisting of longitudinal side members 2 interconnected by transoms, as 3. The frame is supported, as usual, through springs (not shown) from the equalizer bars 4, which in turn have their ends resting on top of the adjacent journal boxes 5 of a wheel and axle assembly generally designated by 6. The said assembly further comprises the spaced wheels 7 and the axle 8 upon which the wheels are secured and whose ends are journaled in the respective journal boxes.

With each wheel of said assembly is associated, to rotate therewith, a rotary brake disc 9 with the opposite faces of which brakes shoes 10 are arranged to cooperate to effect the braking.

The support for said shoes and their acutating means comprises a generally U- or C-form yoke designated generally by 11, said yoke comprising longitudinally extending arms 12 mounted concentrically at the opposite ends of the wheel and axle assembly 6, and a transverse member 13 interconnecting said arms and extending adjacent the peripheries of said discs. The central portion of the transverse member 13 of the yoke is provided, according to the invention, with a short, longitudinally extending arm 14 through which the improved readily detachable universal and cushioned mounting with the adjacent transom 3 of the truck is effected.

This mounting may comprise a unitary subassembly including as a main element thereof a hanger bracket 15 fitting seats on the adjacent vertical wall 16 and the top wall 17 of the transom and bolted thereto by bolts 18, so that the hanger bracket subassembly may be easily mounted and dismounted with respect to the truck frame.

The hanger bracket itself is formed with a longitudinally extending generally rectangular box 19 open at its ends. Within the box 19, but of less width than the box, and equally spaced from its opposite sides, is arranged a block 20 cushioned above and below by thick rubber cushions 21, 21 vulcanized to the adjacent parallel faces of the box and block, respectively.

This block 20 is provided with a transverse opening 22 within which is pressed a wear-resisting bushing 23. This wear-resisting lining bushing receives within it, with a sliding fit, a spacer sleeve 24 of a length permitting its ends to extend laterally through openings 25 in the side walls of the box and terminating some distance beyond the outer side walls of the box. The openings 25 are of greater diameter than the sleeve 24, permitting relative movement of the sleeve in all directions to some extent without metal-to-metal engagement between the sleeve and the margins of said openings in the box or between the block 20 and the sides of the box.

Thus it will be seen that the spacer sleeve of the hanger bracket assembly has cushioned vertical and tilting movement in the hanger box 19 being cushioned in these movements by the rubber in tension and compression, it also having cushioned movement toward the open ends of the box, the rubber acting in shear in this movement. It also has sliding movement transversely in the wear-resisting bushing 23 of block 20, but if for any reason the sliding connection should stick, then the rubber would cushion such lateral movement of the bushing with respect to the box, with the rubber in shear, but such lateral movement of the block and bushing is limited by the engagement of the block with the sides of the box before the rubber is over stressed.

The hanger bracket subassembly so constituted and mounted on the transom of the truck frame may now be conveniently assembled with the yoke support by bringing the spaced furcations 26 of the bifurcated end of the arm 14 into flanking relation with the opposite ends of the spacer sleeve 24, and passing a securing bolt 27 through transversely aligned openings in the furcations and sleeve, the parts being then securely and solidly clamped together by tightening the nut 28 screwing onto the ends of the bolt opposite its headed end. Suitable locking means may be provided to lock the nut against loosening.

It will be noted that by this arrangement the yoke clamped to the spacer sleeve is yieldingly mounted for universal movement in the hanger bracket in the manner hereinbefore described in connection with the description of the mounting of said sleeve. During travel with the brakes off, the relative movements of the yoke and frame are cushioned by the hanger box assembly without metal-to-metal engagement, either through engagement of the block 20 with the sides of the hanger box or through engagement of the sleeve 24 with the margins of the openings in the hanger box through which it extends. When the brakes are applied, however, the braking torque may stress the rubber cushions until the connection becomes a solid metal-to-metal engagement between the sleeve 24 and the margins of the opening 25 in the hanger box, thus preventing overstressing of the rubber in the higher torque loads.

Thus it will be seen that provision has been made for cushioned relative movement between the connected parts in substantially all directions, and this desirable feature has been achieved in a structure which facilitates the assembly of the hanger box as a subsassembly, and which also facilitates the assembly and disassembly of the yoke from the frame, which latter is accomplished by the use of the single transverse bolt 27 and nut 28.

It will be understood that the universal cushioned connection is desirable to permit the yoke to follow the vertical, transverse and longitudinal movements of the wheel and axle assembly with respect to the truck frame without imposing undue strains on the yoke support.

While a specific embodiment of the invention has been herein shown and described, it will be understood that changes and modifications may be made by those skilled in the art without departing from the main features of the invention, and such changes and modifications are intended to be covered by the appended claims.

What is claimed is:

1. In a brake mechanism, a vehicle frame, a supporting wheel and axle assembly, a brake member rotatable with a wheel of said assembly, and a brake means cooperating with said member comprising a yoke-like support carried from said assembly adjacent its opposite ends and from a connection to the frame intermediate its ends, said connection comprising a bracket mounted on the frame, a member mounted for universal movement in said bracket, and readily removable means for solidly securing said support and member, said universal movement being restrained by rubber slabs disposed one above and one below said member and between it and adjacent portions of said bracket whereby relative vertical movements of said member and bracket are mainly resisted by the rubber in compression and relative transverse and longitudinal movements are resisted mainly by the rubber in shear, and means for positively limiting the stressing of the rubber in compression and shear.

2. Means for universally mounting a brake support in a truck frame with capacity for limited relative vertical, longitudinal and transverse movements between said support and frame, comprising a hanger bracket for securement to said frame and having a generally rectangular box-section portion open-ended lengthwise of said frame, a block disposed in said box-section portion and spaced from its sides, top and bottom, and rubber cushioning pads interposed between the top and bottom of the block and the adjacent top and bottom of the box-section portion, respectively, and a member mounted for transverse sliding movement in said block and having its ends extended freely through openings in the sides of said box-section portion and terminating some distance beyond the respective openings, the rubber pads constraining relative vertical movement between the block and bracket with the rubber in compression and relative lateral and longitudinal movement with the rubber in shear, and positive limit means comprising the engagement of said block with the sides of said box-section portion for limiting relative lateral movement and the engagement of said member with the margins of said openings in the sides of the box-section portion for limiting relative vertical and longitudinal movements.

PAUL W. GAENSSLE.
ROBERT G. STACY.